United States Patent
Reich

[15] 3,640,636
[45] Feb. 8, 1972

[54] INTERCHANGEABLE DRILL SUPPORT AND ACTUATING MEANS FOR MICRODRILL

[72] Inventor: Heinz Reich, 15076 Dickens Avenue, San Jose, Calif. 95124

[22] Filed: May 25, 1970

[21] Appl. No.: 39,981

[52] U.S. Cl..............................408/128, 408/129, 408/234
[51] Int. Cl................B23b 41/14, B23b 47/16, B23b 47/18
[58] Field of Search....................408/17, 129, 136, 128, 234, 408/235, 241

[56] References Cited

UNITED STATES PATENTS 2,607,244  8/1952  Cupler ...........................408/128 UX

*Primary Examiner*—Francis S. Husar
*Attorney*—Leslie M. Hansen

[57] ABSTRACT

For a Pick-feed-type drilling apparatus having a belt and pulley drive for maintaining a drill shaft in raised condition and on open bearings for axial movement, an interchangeable drill support for spaced hardened bearings and a spring-loaded actuating means between the drill shaft and a micrometer stroke-controlled plunger for maintaining the latter in raised condition relative to the drill shaft.

10 Claims, 9 Drawing Figures

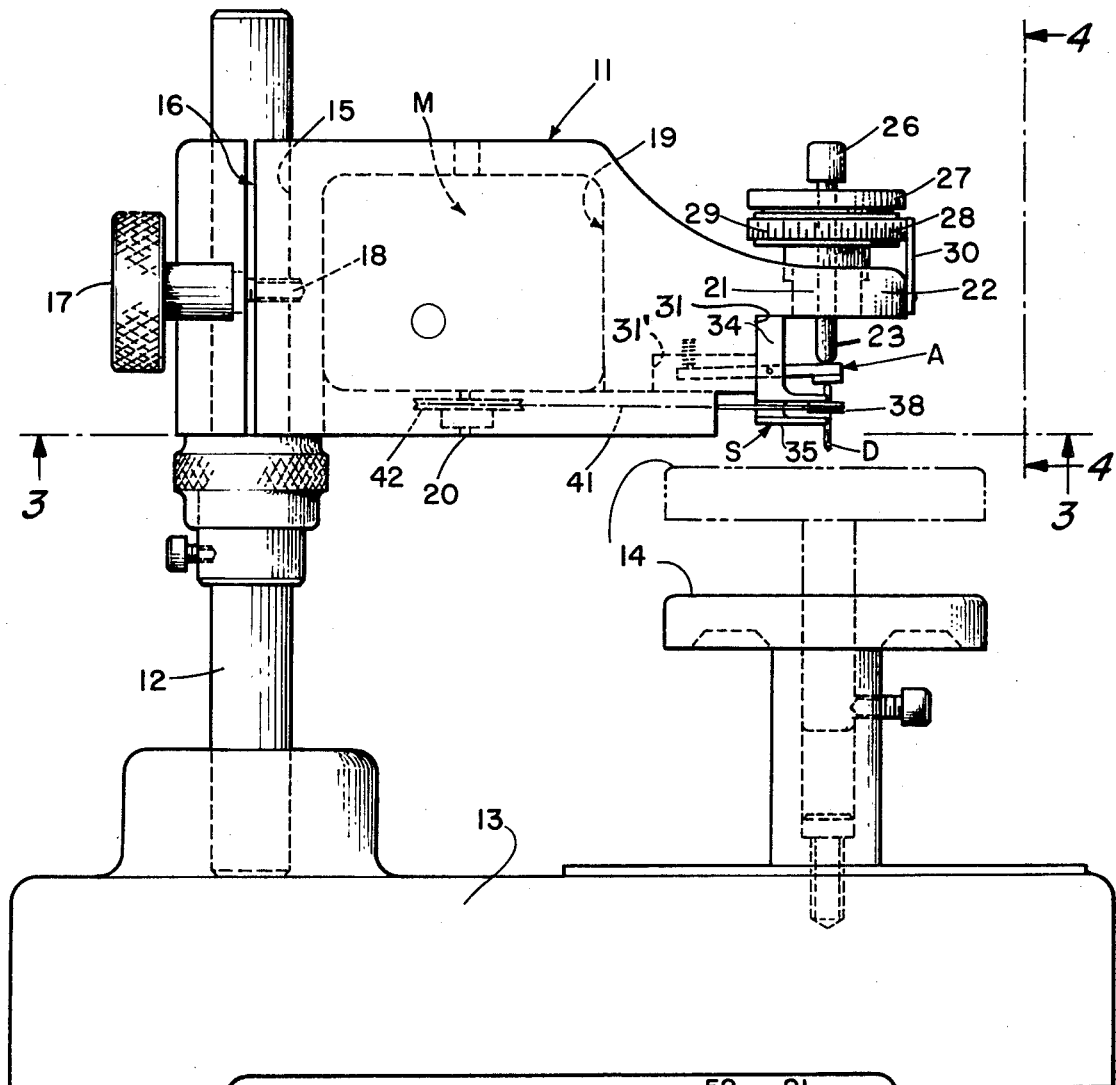
FIG. 2
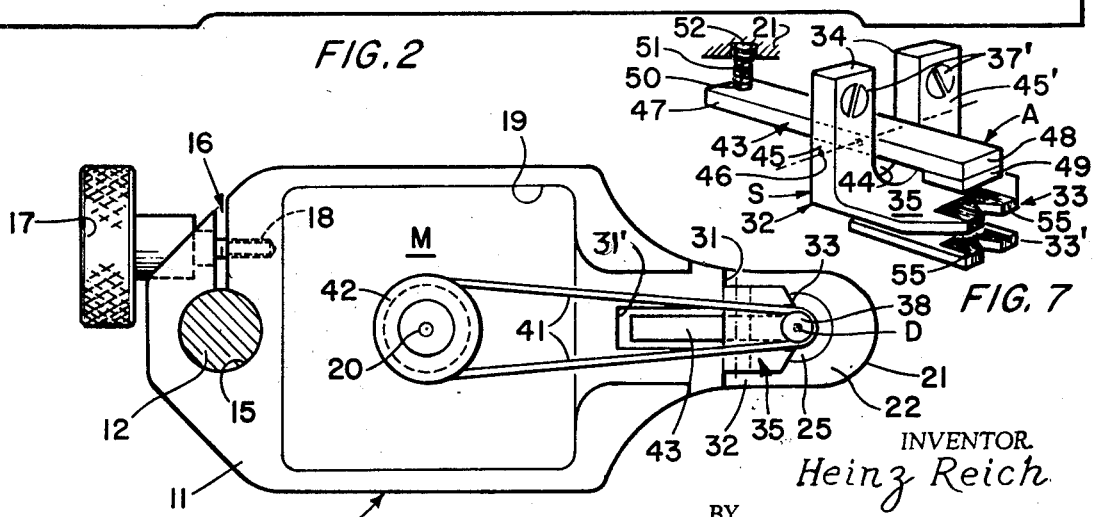
FIG. 3
FIG. 7
INVENTOR.
Heinz Reich
BY
Leslie M. Hansen
HIS ATTORNEY 3,640,636

INTERCHANGEABLE DRILL SUPPORT AND ACTUATING MEANS FOR MICRODRILL

BACKGROUND

This invention relates to drilling machines of the type in which very fine needlelike drills are employed for drilling very small holes in delicate material. Such fine drilling is preferably accomplished in micrometer steps of advancement and in a fashion commonly known as pick-feed. In pick-feed drilling the drill is allowed to withdraw after each slight cutting action after which the pressure means is advanced a minute distance between each actuation of the drill. In such type drilling apparatus it is customary to have the drill formed as a part of a drill shaft and to support the latter in spaced bearings aligned with an actuating means for reciprocation toward and from the material to be drilled. The drill is reciprocated by simply having the drive pulley mounted on its drill shaft and disposed between the spaced bearings and driven by a flexible belt trained about a drive pulley at a higher level to thereby urge the drill and drill shaft into its highermost position. Such general features and characteristics are well known in the art.

STATEMENT OF INVENTION

The present invention is directed to certain novel improvements in pick-feed-type drills and more particularly to an interchangeable drill support and drill-actuating means operatively associated therewith.

It is an object of this invention to provide a mount having bearings of a hardened material disposed to align a drill shaft with an actuating lever and means for supporting the latter in relation thereto.

It is another object to provide such a mount affording minimal clearance for a flexible drive belt trained about the pulley of such drill shaft.

It is yet another object to provide such a mount with means for operatively relating the same to a micrometer adjusted plunger for effecting pick-feed advancement of the drill. In this connection it is another object to support the pick-feed plunger over the actuating lever and to provide the latter with spring means for maintaining the actuating means and plunger free and clear of the drill shaft except when the plunger is intentionally depressed.

It is a further object to provide drill supports with various hardened V-bearings as required for various hardened drills and speeds of operation so as to interchangeable on the drive mechanism and micro-advancing means of the pick-feed-type drilling apparatus.

These and other objects and advantages of the present invention will become apparent from a reading of the following description when read in the light of the accompanying two sheets of drawing in which:

FIG. 2 is a side elevation of FIG. 1 at larger scale;

FIG. 3 is a bottom plan view of the drill mount and motor housing of FIG. 2 as seen looking up from line 3—3 therein;

FIG. 4 is an end view of the drill mount and motor housing of FIG. 2 as seen from line 4—4 therein;

FIG. 5 is an enlarged fragmentary section through the drill mount of FIGS. 2 and 4 and taken along the line 5—5 in the latter;

FIG. 6 is an enlarged fragmentary perspective view of the V-bearing drill support of the drill mount and a drill therefor;

FIG. 7 is a frontal perspective view of the V-bearing frame and drill actuating lever and mount provided thereon;

FIG. 8 is a perspective view of the V-bearing frame of FIG. 7 as seen from the after side thereof, and FIG. 9 is a perspective view of a container for and various sized interchangeable microdrills for use in accordance with the present invention.

GENERAL DESCRIPTION

Figure 1:
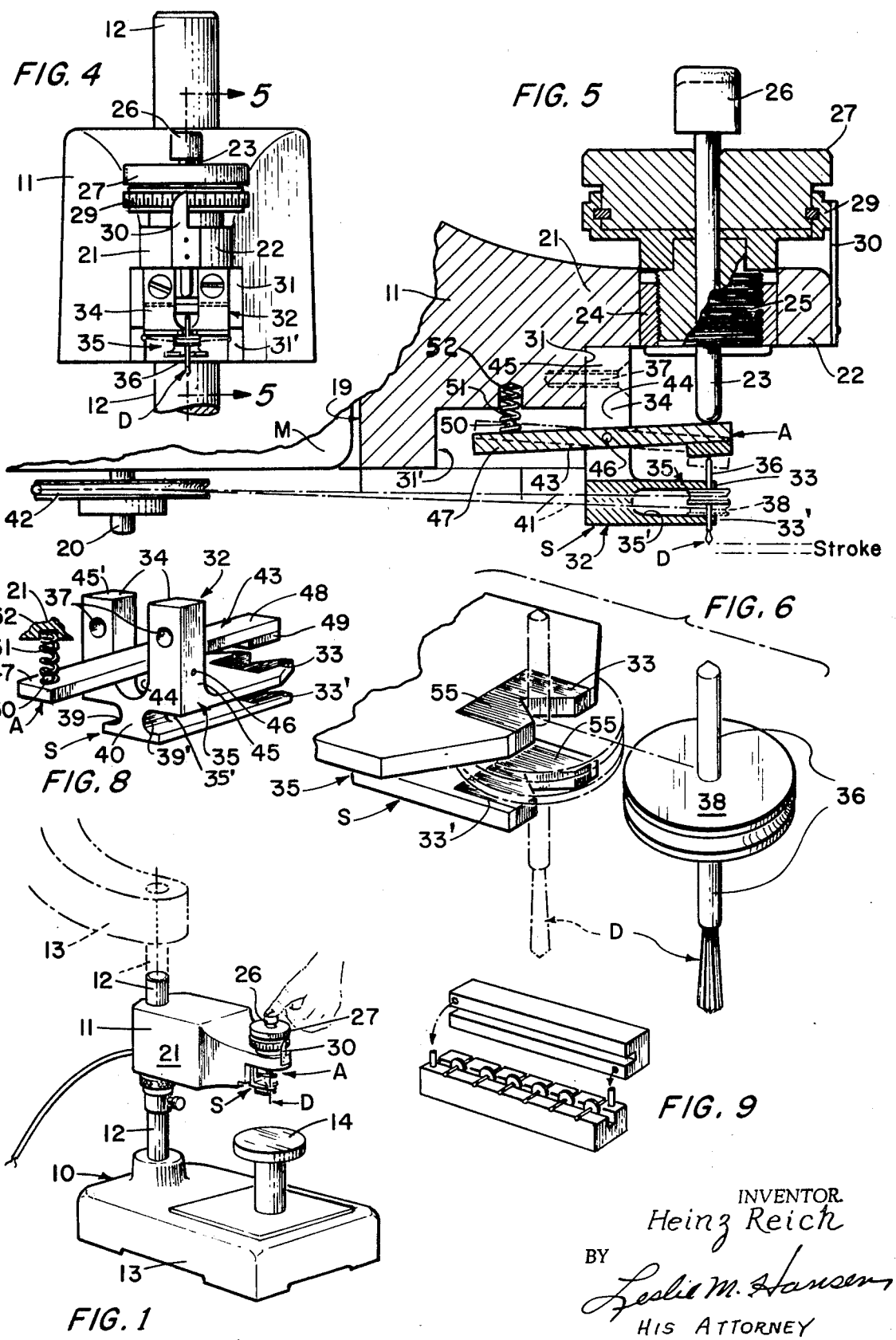
FIG. 1 is a perspective view of a microdrill press embodying the bearing mount and drill-actuation lever of the present invention.

Referring to FIGS. 1, 2 and 3 of the drawings the drill D, drill support S and actuating means A of the present invention have their embodiment in a drilling mechanism generally designated 10. The drilling mechanism 10 is shown to have a main frame 11 adapted to be mounted on a vertical standard or shaft 12. The shaft 12 may be supported on a base 13 or suspended from an overhead support 13' shown in phantom in FIG. 1. In either case the main frame 11 is supported in a fixed condition over a table 14 axially aligned with the drill for supporting material to be drilled.

As best seen in FIGS. 2 and 3 the main frame 11 is provided with a bore 15 open to one side by a narrow slit 16 through which a locking bolt 17 extends having its threaded end 18 so arranged as to bind the slit portion of the frame 11, jawlike about the standard or shaft 12 in a manner well known in the art.

The main frame 11 has a cavity 19 formed therein to provide a housing for an electrical motor M with its drive shaft 20 vertically disposed and extending downwardly therefrom. Beyond the motor housing 19 the frame 11 is provided with a reduced portion 21 which extends out over the table 14. This reduced portion 21 as best seen in FIGS. 2, 3 and 5 has a boss 22 formed thereon coaxially of the table 14 for supporting a plunger 23 for reciprocation vertically above the table. This boss 22 has an internally threaded cylinder 24 press fit therein to receive a micrometric guide 25 for the plunger 23. The plunger 23 has an enlarged head 26 formed thereon for finger action and for limiting the length of stroke of the plunger relative to the micrometric guide 25. A knob 27 operatively connected to the guide 25 facilitates turning thereof for advancing the stroke of the plunger 23 in accordance with indicia 28 on a peripheral dial 29 associated with a needle 30 fixed upon the boss 22.

Beneath the lower surface of the overhanging boss 22 the reduced portion 21 of the frame 11 has an offset vertical face 31 for receiving the drill support S of the present invention. The drill support S as best seen in FIGS. 4, 5, 7 and 8 comprises a unitary replaceable structure uniquely formed and contrived to support the bearings 33 for the drill D as well as the actuating means A between the drill and the plunger 23.

The reduced portion 21 is further recessed as at 31' beneath the offset vertical face 31 to receive a portion of the actuating means A as best illustrated in FIG. 5. The drill support S and actuating means A as independently illustrated in FIGS. 7 and 8 comprise a unitary L-shaped casting 32 and vertical portion 34. The vertical portion 34 has a pair of bores 37' adjacent its upper end for receiving a pair of machine screws 37 having threaded connection with tapped bores provided in the vertical face 31 of the reduced portion 21 of the main frame 11. In this manner the unitary casting 32 is quickly and easily replaceably secured to the main frame 11.

The lower or foot portion 35 of the casting 32 extends from the vertical portion thereof out toward the axis of the plunger 23 and has a pair of V-shaped bearings 33—33' provided thereon for supporting the drill shaft 36 of a drill D coaxially of the plunger. For this reason the foot portion 35 is recessed as at 35' beyond the plane of the vertical portion 34 to provide clearance for a pulley 38 provided on the drill shaft 36. The foot portion 35 is further recessed as at 39–39' on either side of the midsection 40 thereof as shown in FIG. 8 to provide clearance for a drive belt 41 when the latter is trained about the pulley 38.

The belt 41 is driven by a drive pulley 42 secured to the shaft 20 of the motor M. As shown in FIG. 5 the drive pulley 42 is disposed at a higher elevation than the recesses 35', 39 and 39' of the foot portion 35 to thereby constantly tend to maintain the pulley 38 on the drill shaft 36 at its highest elevation between the V-bearings 33–33'. The drive belt 41 is stretch fit over the pulleys 38 and 42 and is preferably of an elastic material such as a neoprene O-ring. In this manner the drill shaft 36 is constantly maintained in bearing relation with the V-bearings 33–33' and withdrawn to its highest elevation relative to the stroke afforded the drill D relative to the worktable 14.

The stroke afforded the drill D and drill shaft 36 is instituted by depression of the plunger 23 as limited by the micrometer adjustment of the guide 25. This stroke, however, is under control of the actuating means A in the form of a spring-loaded lever 43 carried by the unitary casting 32 of the drill support S. For this reason the vertical leg 34 of the L-shaped casting 32 is provided with a passage 44 provided by the bifurcation of the leg 34. This provides a trunnion arrangement between arms 45–45' for the lever 43 by which the midportion thereof is pivotally mounted on a pin shaft 46 having its ends supported in the arms 45–45' of the bifurcated leg 34.

The lever 43 is disposed in a plane below the vertical face 31 of the reduced portion 21 and has its after end 47 extending into the recess 31' (FIG. 5). The opposite or fore end 48 of the lever 43 extends outwardly above the foot portion 35 and has its extreme end disposed between the plunger 23 and the upper end of the drill shaft 36. A pad 49 of hardened material is mounted on the bottom face of the extreme end of the lever 43 to engage the upper end of the drill shaft 36. This pad 49 is of a material much harder than that of the drill shaft 36 to provide suitable nongalling, nonwearing contact between them when pressed together.

The after end 47 of the lever 43 has a knob 50 mounted on its upper face to receive one end of a compression spring 51 the opposite end of which seats in a cavity 52 formed in the reduced portion 21 of the main frame 11. By this arrangement the lever 43 is constantly urged anticlockwise (FIG. 5) to maintain the opposite end 48 thereof in raised position free and clear of the drill shaft 37. By the same arrangement the free end 48 of the lever 43 elevates the plunger 23 relative to the guide member 25, however, upon depression of the plunger 23 the spring-loaded lever 43 yields and applies pressure between the hardened pad 49 and the drill shaft 36 to advance the latter the limited stroke afforded.

The drill D as best seen in FIG. 6 is formed on the lower end of the drill shaft 36, preferably as an integral part thereof. The pulley 38 is either press fit upon the shaft 36, secured thereto by a setscrew or may be formed integrally with the shaft 36. These drills D are provided in various sizes as illustrated in FIG. 9 and are interchangeably mountable upon the drill support by means of the elastic belt 41. The drills D are quite small and needlelike in form and it usually requires optic assistance of a microscope to perform drilling operations therewith.

Due to the precision required in such drilling operations the V-bearings 33–33' are provided with carbon and/or diamond hard inserts 55 as shown in FIG. 6. These inserts are suitably secured upon the spaced flanges of the foot portion 35.

Since some drill shafts are of harder metal than others it is a purpose of the present invention to provide the interchangeable drill support S with V-bearings of various hardnesses as required. Consequently, some units S have expensive diamond V-bearings while others have less expensive carbon bearings 50. The units are replaceable and interchangeable by merely removing the two machine screws 37 and remounting another suitable unit in place.

With the proper drill support S in place and the required drill D drivingly mounted on the V-bearings, the motor M drives the drill shaft 36 while the plunger 23 is depressed in momentary strokes. The plunger is adapted for finger depression by thumb action in pick-feed fashion as exemplified in FIG. 1. Each stroke is limited by the limit of movement of the head 26 of the plunger 23 relative to the micro-adjustable knob 27. In this manner the drill D is caused to cut into the material worked upon momentarily and to withdraw automatically by action of the belt and pulley arrangement when the plunger is released. At the end of each stroke the knob 27 is turned a digetal distance as noted on the dial face 28 to advance the knob and plunger for the next pick-feed stroke against the drill shaft.

Having thus described the novel features of my microdrill in specific detail it will be appreciated by those skilled in the art that the same may be altered, varied and/or modified without departing from the spirit or scope of the invention therein as defined in the appended claims.

What I claim as new and desire to protect by Letters Patent is:

1. In a pick-feed drilling apparatus of the type having a self-elevated belt and pulley driven drill shaft supported coaxially of the depressible plunger for moving the drill on such drill shaft toward material to be drilled, the combination therewith of a drill support and actuating means therefor comprising:

A. a frame having a boss for supporting such plunger coaxially of such drill shaft, said frame having a vertical face formed in offset relation to and beneath said boss;
   B. an L-shaped drill support having a vertical leg portion secured to the vertical face of said frame and a foot portion extending therefrom toward the axis of such drill shaft and plunger; said foot portion having upper and lower bearings thereon in spaced relation to each other for receiving the pulley of the drill shaft and for supporting the drill shaft coaxially of the plunger; and
   C. a spring-urged-actuating means mounted on said drill support and having a portion thereof disposed between such drill shaft and plunger for maintaining said plunger in raised condition relative to such drill shaft.

2. The drill support and actuating means in accordance with that of claim 1 in which the upper and lower bearings on said foot portion comprise a pair of flat foot portions each having carbon hard open faced V-bearing inserts secured thereto in parallel relation to said flat foot portions.

3. The drill support in accordance with that of claim 2 in which said foot portion is recessed on both side edges to provide clearance for belt drive and recessed on its outer edge to provide clearance for the pulley of the drill shaft when the latter is drawn into the open V-bearings by the belt.

4. The drill support and actuating means in accordance with that of claim 3 in which said carbon hard open faced V-bearings consist of diamonds.

5. The drill support and actuating means in accordance with that of claim 3 in which said L-shaped drill support is replaceably mounted on the vertical face of said frame.

6. The drill support and actuating means in accordance with that of claim 5 in which the vertical leg of said L-shaped drill support has a passage formed therethrough, and means across said passage for pivotally supporting said spring-urged-actuating means on said vertical leg for rocking movement in a plane congruent to the axis of the drill shaft and plunger.

7. The drill support is accordance with that of claim 5 in which the vertical leg of said L-shaped drill support is bifurcated vertically to provide a passage therethrough, means for releasably securing the bifurcated vertical leg to the vertical face of said L-shaped drill support, said actuating means comprising a lever extending through the passage provided between the bifurcated vertical leg, said actuating lever having its outer end disposed between the drill shaft and the plunger and its after end disposed beneath the boss of said frame, and spring means between the after end of said lever and said frame for maintaining the outer end of said lever and the plunger in raised condition relative to the drill shaft.

8. The device in accordance with that of claim 7 in which the outer end of said actuating lever means has a hardened pad on that face thereof disposed to engage the drill shaft.

9. The device in accordance with that of claim 8 in which the boss supporting the plunger for reciprocation has a vernier threaded guide mounted in said boss, and means for advancing said threaded guide in micrometric steps toward said drill shaft.

10. The device in accordance with that of claim 9 including a dial on the periphery of said vernier threaded guide, and a pointer mounted on said boss adjacent the periphery of said threaded guide for indicating increments of advancement of the latter relative to said boss.